(12) United States Patent
Varacins et al.

(10) Patent No.: US 7,995,905 B2
(45) Date of Patent: Aug. 9, 2011

(54) FLASH STEAM GENERATOR

(75) Inventors: Alan Varacins, Burlington, WI (US); James Doherty, Gurnee, IL (US); Atul Saksena, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 974 days.

(21) Appl. No.: 11/851,189

(22) Filed: Sep. 6, 2007

(65) Prior Publication Data

US 2008/0053383 A1 Mar. 6, 2008

Related U.S. Application Data

(60) Provisional application No. 60/842,497, filed on Sep. 6, 2006.

(51) Int. Cl.
*H05B 3/02* (2006.01)

(52) U.S. Cl. .......................... 392/303; 392/399; 392/397

(58) Field of Classification Search .................. 392/303, 392/399
See application file for complete search history.

(56) References Cited

U.S. PATENT DOCUMENTS

| | | | | | |
|---|---|---|---|---|---|
| 1,926,958 | A | * | 9/1933 | Peterson | 392/391 |
| 2,447,294 | A | * | 8/1948 | Vickery | 392/328 |
| 3,854,032 | A | * | 12/1974 | Cooper | 219/383 |
| 4,429,213 | A | * | 1/1984 | Mathieu | 392/468 |
| 4,516,425 | A | * | 5/1985 | Chollet et al. | 73/198 |
| 5,949,958 | A | * | 9/1999 | Naperkowski et al. | 392/399 |
| 6,021,819 | A | * | 2/2000 | Cannell | 138/177 |
| 6,094,523 | A | * | 7/2000 | Zelina et al. | 392/399 |
| 6,647,204 | B1 | * | 11/2003 | Hutchinson | 392/491 |
| 7,377,122 | B2 | * | 5/2008 | Kidwell et al. | 62/260 |
| 7,801,424 | B2 | * | 9/2010 | Cheung | 392/399 |
| 2004/0146289 | A1 | * | 7/2004 | Sakamoto et al. | 392/465 |

* cited by examiner

*Primary Examiner* — Thor S Campbell
(74) *Attorney, Agent, or Firm* — Thompson Hine LLP (57) ABSTRACT

The invention relates to a method and system for producing steam in a heating unit, and a method of designing a heating unit for producing steam. The method relates to receiving a liquid including impurities at a predetermine flow rate within an entry port of a monotube in the heating unit, where the monotube has a lumen of a predetermined size. The received liquid is converted into a two phase flow including turbulent and laminar flow. At least the turbulent flow is passed through the lumen at a velocity sufficient to carry the impurities through an exit port of the monotube and produce steam. The velocity of the turbulent is responsive to at least the predetermined flow rate and predetermined size of the lumen.

15 Claims, 8 Drawing Sheets

FLASH STEAM GENERATOR

CROSS-REFERENCE TO RELATED APPLICATIONS

This application claims the benefit of, and priority from, U.S. Provisional Application Ser. No. 60/842,497 filed Sep. 6, 2006, the complete subject matter of which is incorporated herein by reference in its entirety.

FIELD OF THE INVENTION

Embodiments of the invention relate to a system and method for producing steam. More particularly, embodiments of the invention relate to a system and method for producing steam in cooking, preparing or cleaning applications.

BACKGROUND OF THE INVENTION

Steam is used in commercial kitchens in appliances of various types. Steamers for cooking vegetables and fish for example, or for re-therming food products to serving temperature, are well known in the industry. Recently, convection-steam and convection-steam-microwave ovens have become commercially available for baking and roasting applications. Steam has also been used, at least experimentally, in ware wash machines for heating ware and hydrating soil.

There are two conventional approaches for locally producing steam in an appliance: immersion boiling and open pan boiling. In immersion boiling (alternatively referred to as an 'immersion steam generator') a heating element (usually an electrical heating element, although a gas heating element is also contemplated) is immersed in a vat of water. The heating element heats the water, which boils to produce steam. Immersion steam generators may be used to produce large amounts of steam and are commercially attractive as their operating pressures are low. However, any metal ions in the water (either light ions, such as sodium or potassium, or heavy ions, such as calcium, iron or manganese) are left behind and are usually found deposited on the vat wall, the heating element or both. These deposits (alternatively referred to as 'scale deposits') may be sizable (up to 2 grams per gallon of water to steam).

Deposits in immersion steam generators are usually managed or treated by regularly flushing the vat with an acid solution to dissolve the deposits or by treating the incoming water to reduce or eliminate ions. The vat must be serviced often to properly manage the deposits. However, using an acid solution to service the immersion steam generator is inconvenient and is thus generally neglected, causing deposit buildup, which in turn reduce the life span of the immersion steam generator. Treating the water is expensive as compared to servicing the steam generator and, depending on the treatment method chosen, may also require servicing.

Open pan boiling (alternatively referred to as 'pan boiling systems') is more often used in less expensive steamers. Pan boiling systems include a shallow pan of water in a heated iron bottom (or other metal bottom) of the system. The heat is provided or supplied from below the system. This style of steam generation is often preferred over immersion steam generation as the heat, and the resultant steam, is only produced when needed. That is immersion steam generators usually operate continuously due to their long heat up time. However, currently available pan boiling systems have low steam production capacity and are susceptible to the same metal ion deposit limitations as immersion steam generators, thus requiring similar scale deposit management.

Monotube steam generators are also commercially available to produce steam. However, such known monotube steam generators are sized to reduce material consumption and minimize the diameter to accommodate fluid flow.

It would, therefore, be desirable to design a heating unit that reduces scale deposit buildup. It would further be desirable to produce steam using such a heating unit that reduces scale deposit buildup.

SUMMARY OF THE INVENTION

One aspect of the invention relates to a method of producing steam in a heating unit, and a method of designing a heating unit for producing steam. The method of producing steam (at an exit port for example) relates to receiving a liquid (via a spray for example) including impurities at a predetermine flow rate within an entry port of a monotube in the heating unit, where the monotube has a lumen of a predetermined size. The received liquid is converted into a two phase flow including turbulent and laminar flows. At least the turbulent flow is passed through the lumen at a velocity sufficient to carry the impurities through an exit port of the monotube and produce steam. The velocity of the turbulent flow is responsive to at least the predetermined flow rate and predetermined size of the lumen.

One aspect of the invention relates to forming the turbulent flow ($T_F$) and laminar flow ($L_F$) in a predetermined ratio of $T_F/L_F \leq 0.10\ (T_F+L_F)$.

Yet another aspect of the invention relates to a method of designing a heating unit for producing steam including determining a maximum steam output of the heating unit such that a liquid received therein at a predetermined flow rate is converted into a two phase flow comprising turbulent and laminar flow. The method further comprises sizing a monotube having a lumen, whereby at least the turbulent flow is passed through the lumen at a velocity sufficient to carry the impurities through an exit port of the monotube in fluid communication with the lumen and produce the steam at the exit port, whereby the velocity is responsive to the predetermined flow rate and size of the monotube.

Aspects of the invention relate to sizing the monotube responsive to the turbulent flow ($T_F$) and laminar flow ($L_F$) formed in a predetermined ratio of $T_F/L_F \leq 0.10\ (T_F+L_F)$. Aspects further comprise sizing the monotube including determining a Reynolds number (greater than 2000 for example), determining a Leidenfrost temperature for the liquid and/or determining an inner diameter and length for the lumen.

Still another aspect of the invention relates to a heating apparatus for producing steam. The heating apparatus includes means for receiving a liquid including impurities at a predetermined flow rate; means for converting the received liquid into a two phase flow (turbulent and laminar flow for example) and means for passing at least the turbulent flow there through. In at least one embodiment, the passing means passes at least the turbulent flow a velocity sufficient to carry the impurities along and produce the steam, where the passing means is responsive to at least the predetermined flow rate and a predetermined size of the passing means.

In at least one embodiment, the receiving means comprises at least one spray and/or the converting means comprising at least one heating element adapted to heat at least the received liquid to a predetermined temperature below a Leidenfrost temperature for the liquid. In yet another embodiment, the passing means comprises a coiled monotube of predetermined length, a lumen having a predetermined inner diameter and entry and exit ports in fluid communication with the lumen. The converting means produces said turbulent flow ($T_F$) and said laminar flow ($L_F$) in a ratio of $T_F/L_F \leq 0.10$ ($T_F + L_F$).

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

Throughout the various figures, like reference numbers refer to like elements.

DETAILED DESCRIPTION OF PRESENTLY PREFERRED EMBODIMENTS

Figure 1:
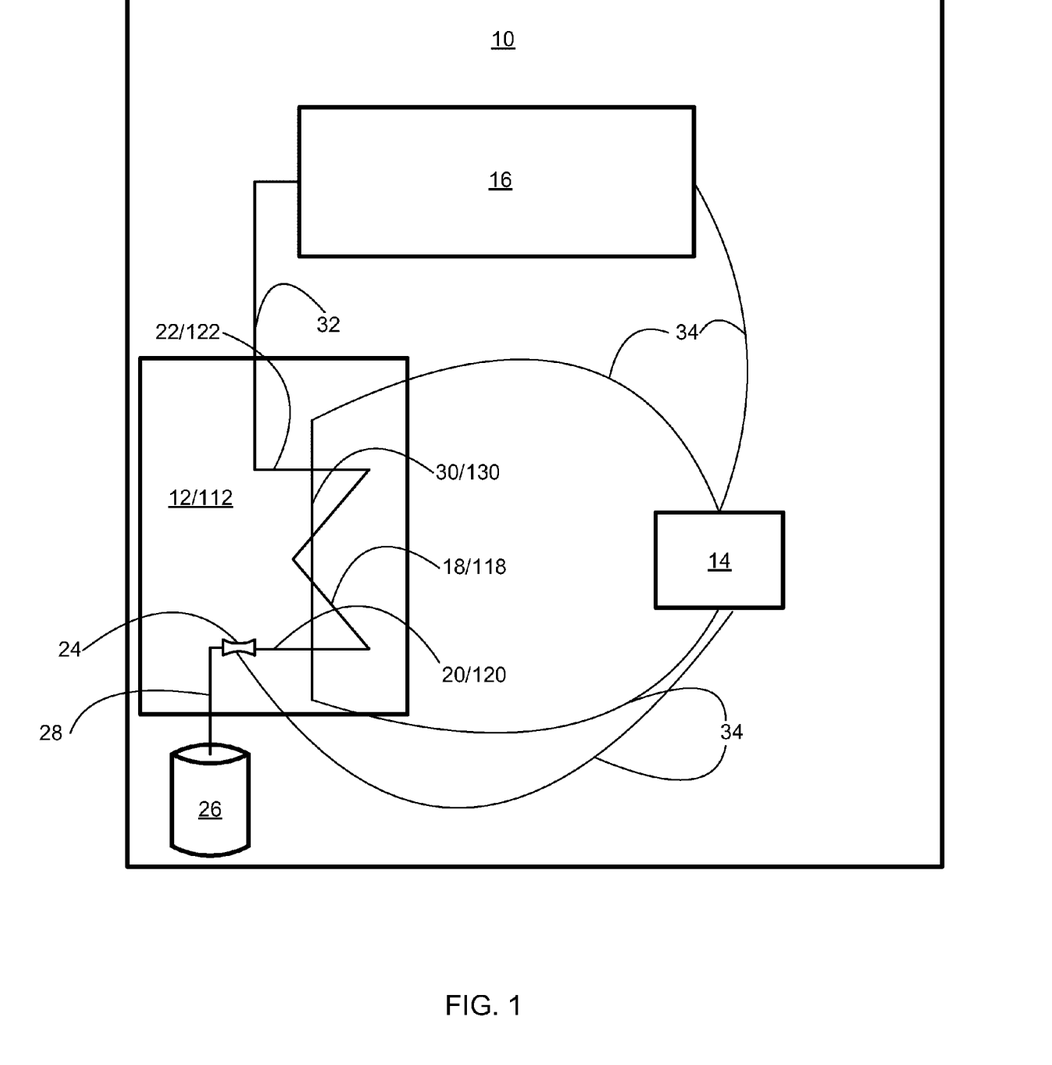
FIG. 1 depicts a block diagram of a cooking appliance having a heating apparatus in accordance with one embodiment of the present invention.

FIG. 1 depicts a block diagram of a cooking appliance, generally designated 10. As illustrated, appliance 10 includes a heating apparatus 12/112 for producing steam coupled to or communicating with control unit or processor 14 and cooking chamber 16. In accordance with one embodiment, heating apparatus 12/112 includes means for producing steam comprising means for receiving a liquid including impurities at a predetermined flow rate; means for converting the received liquid into a two phase flow, the flow comprising turbulent and laminar flow; and means for passing at least the turbulent flow there through at a velocity sufficient to carry the impurities along and produce the steam, wherein the passing means is responsive to at least the predetermined flow rate and a predetermined size of the passing means.

More specifically, heating apparatus 12/112 includes a chamber 18/monotube 118 having an input or entry port 20/120 and output or exit port 22/122 in fluid communication.

In the embodiment depicted in FIG. 1, cooking appliance 10 includes at least one nozzle or spray device 24 coupled to or fluidly communicating with entry port 20/120 and a supply 26 via hose or tubing 28, and adapted to provide a liquid (water for example) including any impurities at a predetermined flow rate. While spray device 24 is illustrated, any means for providing a liquid at a predetermined flow rate is contemplated, including having supply 26 coupled directly to entry port 20/120. Furthermore, while only one spray device 24 is shown and discussed, more than one spray device is contemplated.

In at least one embodiment, heating apparatus 12/112 is adapted to convert liquid received therein into a two phase flow, the flow comprising turbulent and laminar flows and pass at least the turbulent flow there through at a velocity sufficient to carry the impurities along and produce the steam (at the exit port 22/122 for example). In one embodiment the two phase flow comprises a liquid and gaseous flow where each of the liquid and gaseous flows comprise laminar and turbulent flows. As illustrated, heating apparatus 12/112 includes at least one heating element 30/130 adapted to heat at least the received liquid to a predetermined temperature. In at least one embodiment, the heating element 30/130 heats the liquid to a predetermined temperature below a Leidenfrost temperature for the liquid (between about 325 degrees and about 460 degrees Fahrenheit or to about 390 degrees Fahrenheit for example).

FIG. 1 further depicts cooking chamber 16 fluidly coupled to exit port 22/122 via hose or tubing 32, where cooking chamber 16 is adapted to cook or re-therm food products. Control unit 14 is illustrated coupled to spray device 24, heating element 30/130 and/or cooking chamber 16 via one or more connections 34, where control unit 14 is adapted to control the cooking appliance 10 by controlling one or more of the elements thereof.

Figure 2:
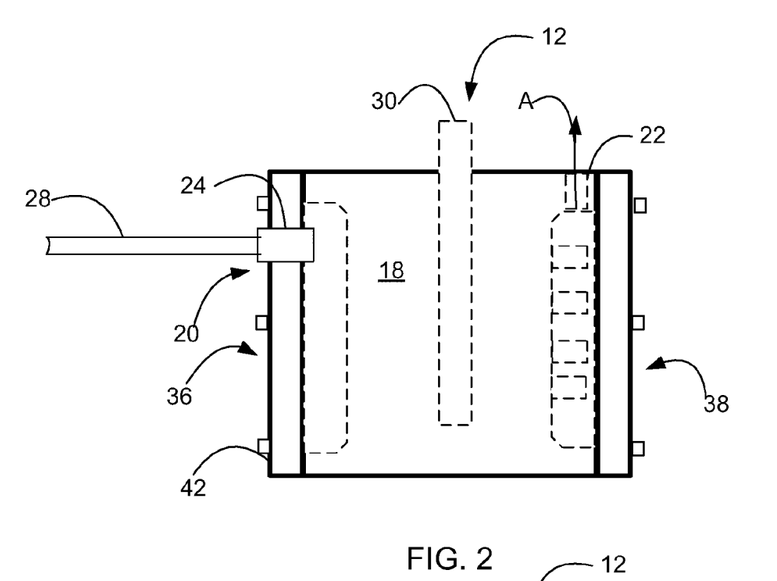
FIG. 2 depicts a partial cross sectional end elevational view of a heating apparatus of FIG. 1 in accordance with one embodiment of the present invention.
Figure 3:
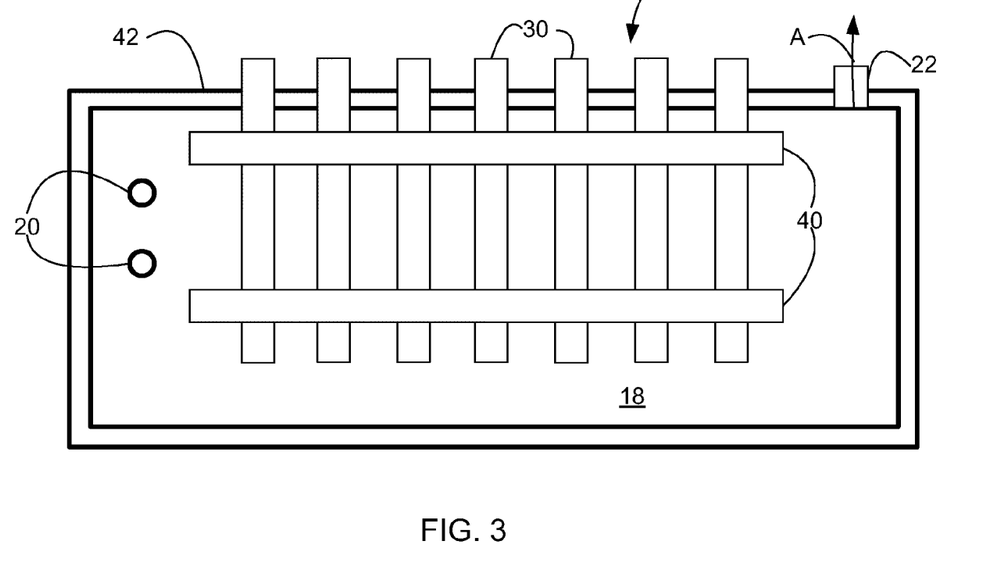
FIG. 3 depicts a partial cross sectional side elevational view of a heating apparatus of FIG. 1 in accordance with one embodiment of the present invention.

FIGS. 2 and 3 depict partial cross sectional views of heating apparatus 12 of FIG. 1 in accordance with one embodiment. FIG. 2 depicts heating apparatus 12 having housing 42 defining chamber 18 and including a first portion or steam generator side 36 and second portion or super heat side 38 adapted to convert the liquid received therein into a two phase flow, the flow comprising turbulent and laminar flows at a predetermined Reynolds number (greater than 2000 for example). The heating apparatus 12 produces steam at exit port 22 in the direction indicated by arrow A, which in turn is used to cook, heat or re-therm food products as provided previously. In one embodiment the two phase flow comprises a liquid and gaseous flow where each of the liquid and gaseous flows comprise laminar and turbulent flows.

FIG. 3 depicts the heating apparatus 12 having a plurality of heating elements (electrical heating elements although other elements, including gas or liquid heating elements are contemplated). The heating elements 30 are in communication with one or more heat transfer fins 40, adapted to evenly heat the liquid. FIG. 3 further depicts ports 22 adapted to pass steam from the generator side 36, super heating it using one or more heating elements 30 and/or heat transfer fins 40, producing the super heated steam at exit port 22 in the direction indicated by arrow A.

Figure 4:
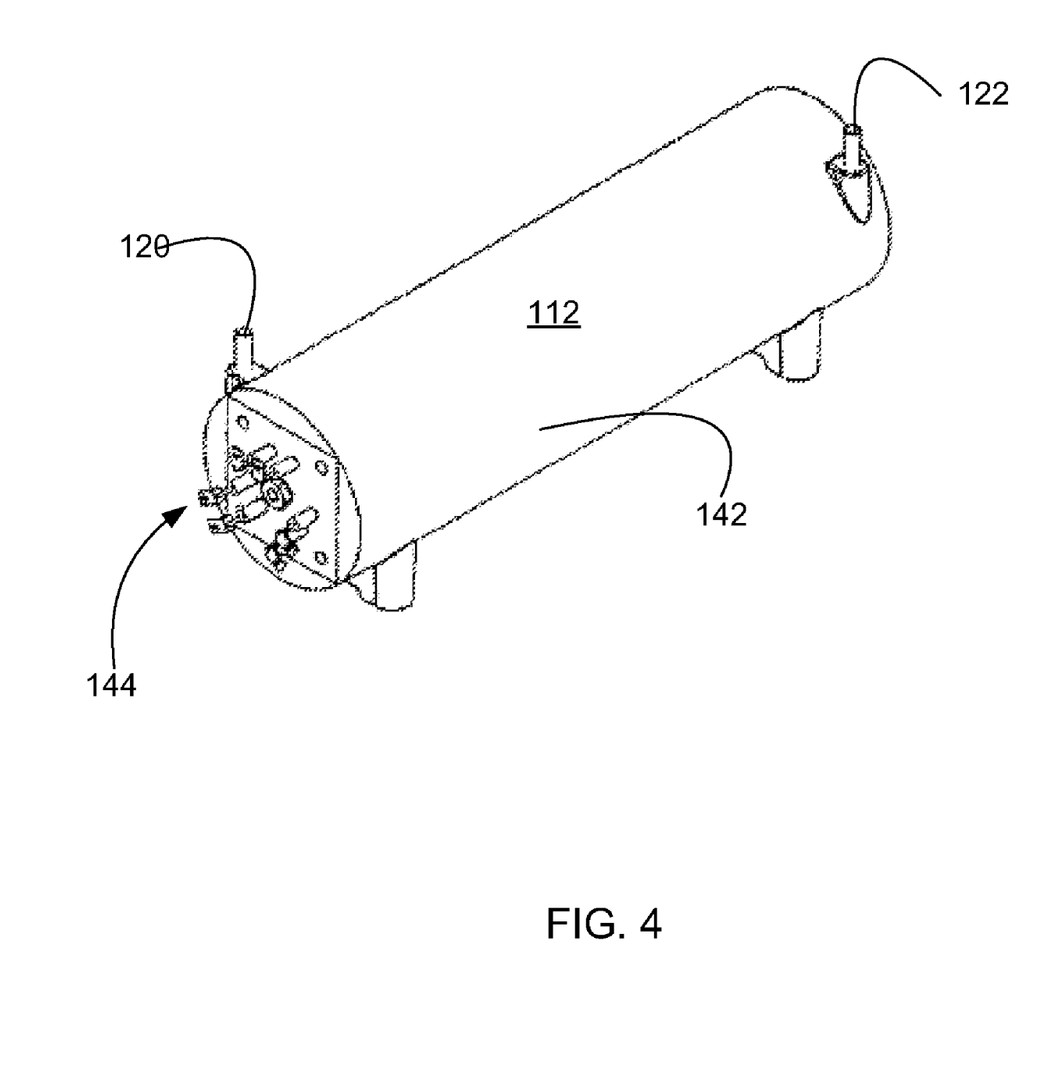
FIG. 4 depicts a perspective view of the heating apparatus of FIG. 1 in accordance with another embodiment of the present invention.

FIG. 4 depicts one embodiment of a heating element 112 similar to the heating apparatus 12 of FIGS. 2 and 3. FIG. 4 depicts apparatus 112 having housing 142 including connections 144, where housing 142 is adapted to contain at least monotube 118.

In the illustrated embodiments, connections 144 comprise one or more electrical connections 144 in communication with a heat transfer means. While electrical connections and electrical heating elements are shown and discussed, other connections and heating element 130 (gas or oil for example) are contemplated.

In at least one embodiment, the heat transfer means comprises a heating element 130 in communication with a heat transfer device (not shown) which in turn is in communication or contact with at least a portion of the monotube 118, where the heat transfer device is adapted to uniformly heat the monotube 118, providing good heat conduct thereto, thereby reducing hot spots and stress. In one example, the heat transfer device comprises an aluminum block (although other metals or materials are contemplated) having a predetermined mass and adapted to conduct heat in a uniform manner. The heating element 130 is embedded or otherwise disposed in the aluminum block which is in intimate contact with at least a portion of the monotube 118, providing uniform heat thereto, reducing hot spots and stress therein.

Figure 5:
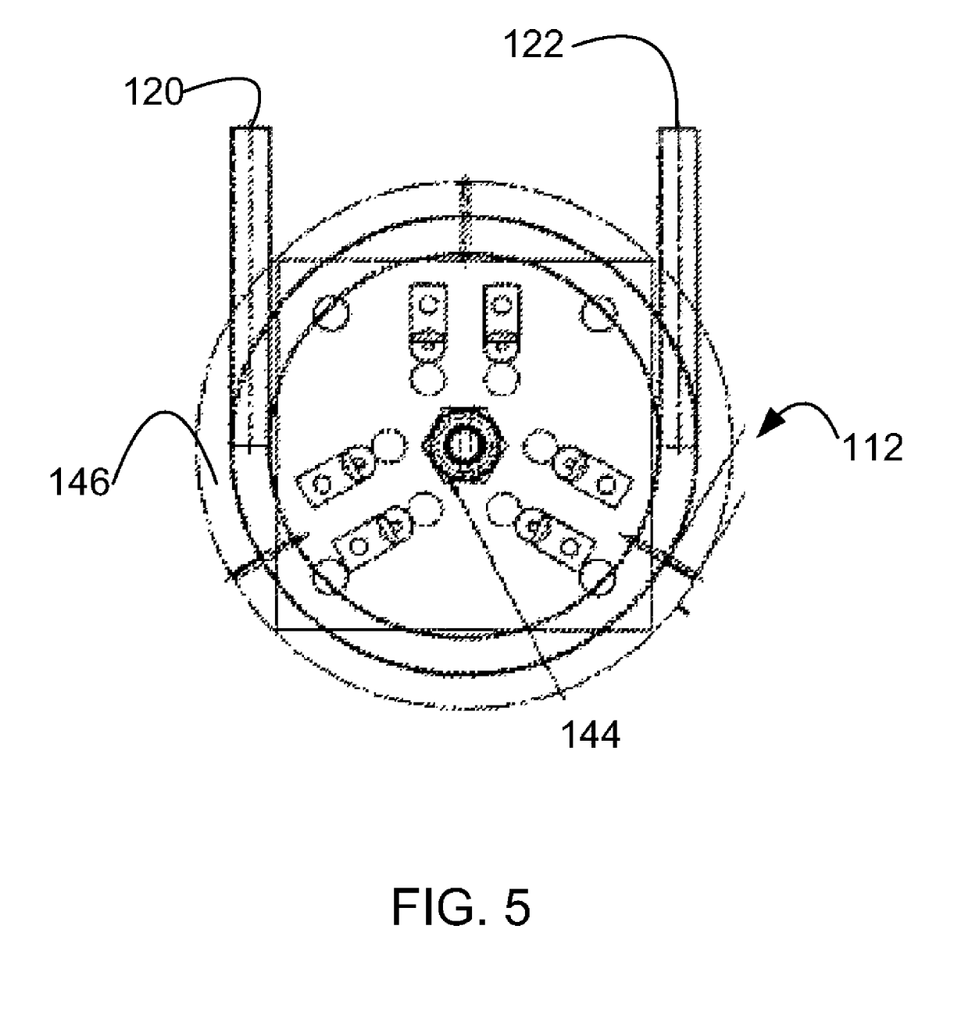
FIG. 5 depicts an end elevational view of the heating apparatus of FIG. 1 in accordance with one embodiment of the present invention.
Figure 6:
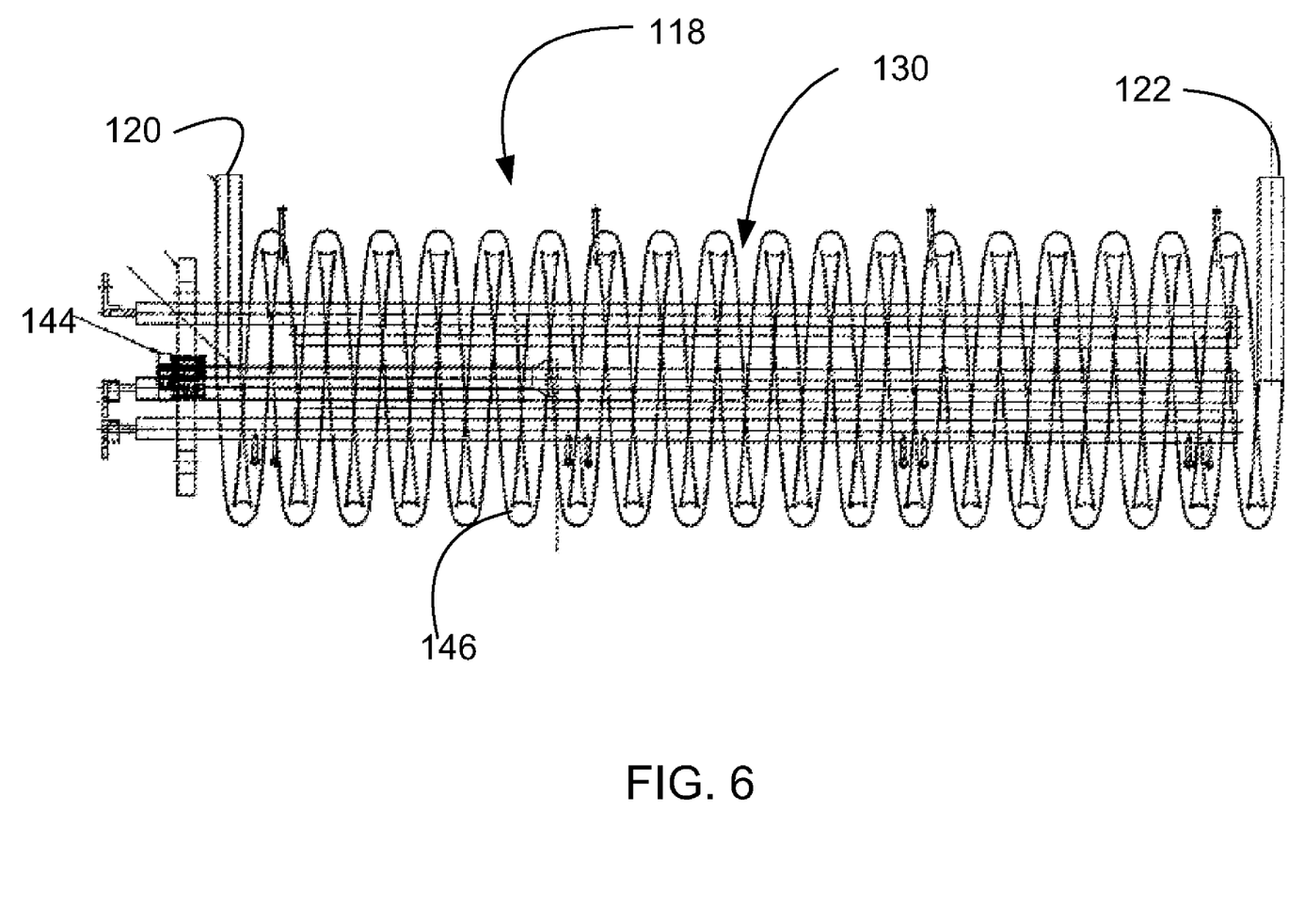
FIG. 6 depicts a partial-cross sectional side elevational view of the monotube of FIG. 5 in accordance with one embodiment of the present invention.

FIGS. 5 and 6 depict end and side elevational views of a coiled monotube 118 of the heating apparatus of FIG. 4 in accordance with one embodiment of the present invention. FIGS. 5 and 6 depict monotube 118 defining an inner space, duct or opening 146 (alternatively referred to as a 'lumen') and having a predetermined size (i.e., a predetermined diameter, length and/or number of coils) in fluid communication with entry and exit ports 120 and 122. In one embodiment, the monotube 118 is adapted to receive the liquid including impurities at a predetermined flow rate at entry port 120 and convert the received liquid into a two phase flow including turbulent and laminar flow and pass at least the turbulent flow through lumen 146 at a velocity sufficient to carry the impurities through to exit port 122, producing steam.

In at least one embodiment, the velocity of the turbulent flow is responsive to the predetermined flow rate of the liquid, the predetermined size of the monotube 18 (inner diameter or lumen diameter, length and/or number of coils or turns), the Reynolds number (greater than 2000 for example) and/or the Liedenfrost temperature of the liquid (in a range of about 325 degrees and about 460 degrees Fahrenheit), where the turbulent flow ($T_F$) and said laminar flow ($L_F$) are formed in a predetermined ratio of $T_F/L_F \leqq 0.10\,(T_F+L_F)$.

Figure 7:
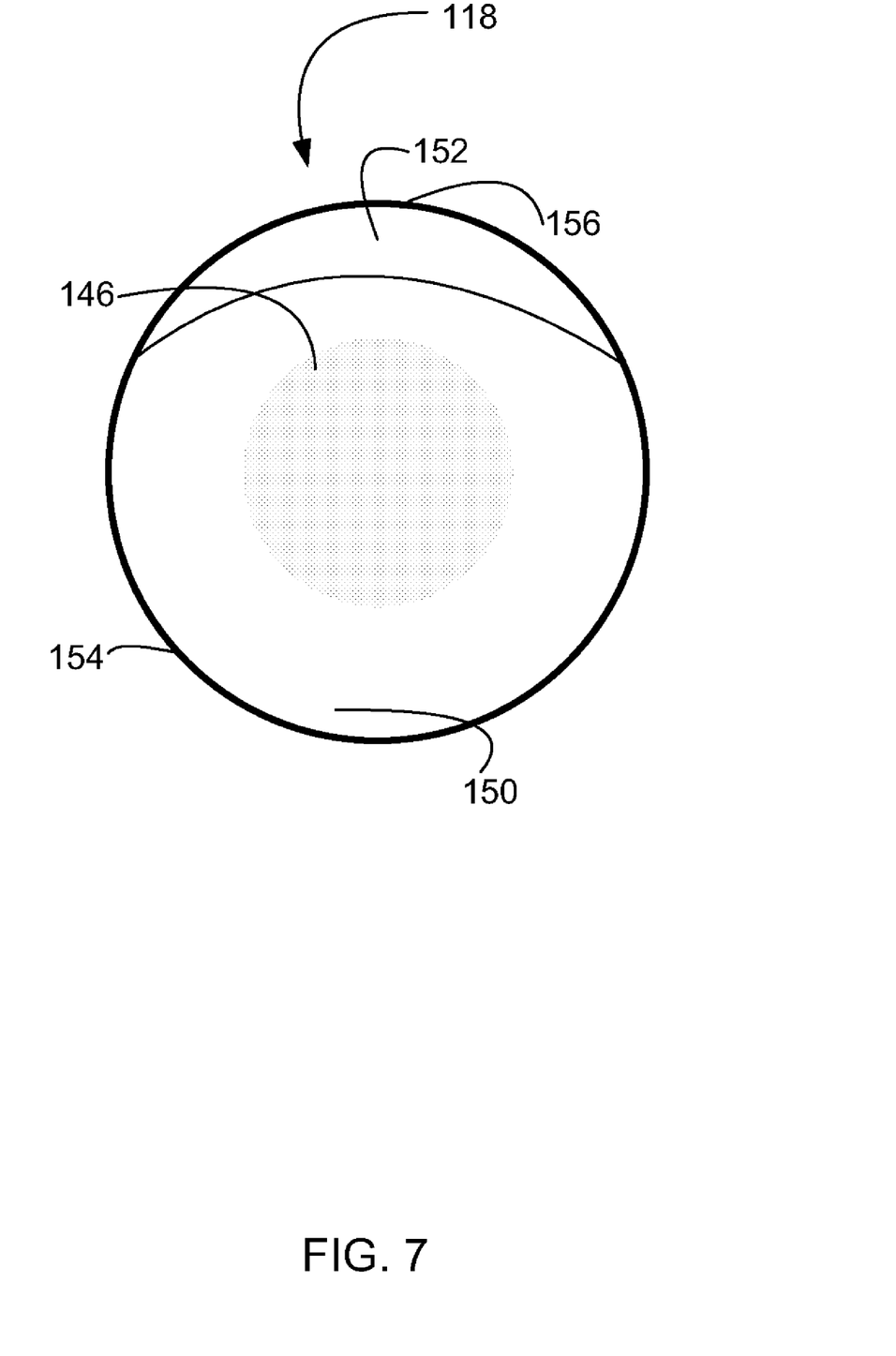
FIG. 7 depicts a cross-sectional view of the monotube used in the heating apparatus of FIG. 5 illustrating the laminar and turbulent flow proximate the entry port in accordance with one embodiment of the invention.

FIG. 7 depicts a cross-sectional view of the monotube 118 and lumen 146 of FIG. 5 proximate entry port 120. FIG. 7 illustrates laminar and turbulent flows 150 and 152 respectively, where turbulent flow ($T_F$) and laminar flow ($L_F$) are converted or produced in a ratio of $T_F/L_F \leqq 0.10\,(T_F+L_F)$. FIG. 7 further depicts monotube 118 having first portion 154 fluidly contacting laminar flow 150 and second portion 156 fluidly contacting turbulent flow 152.

Figure 8:
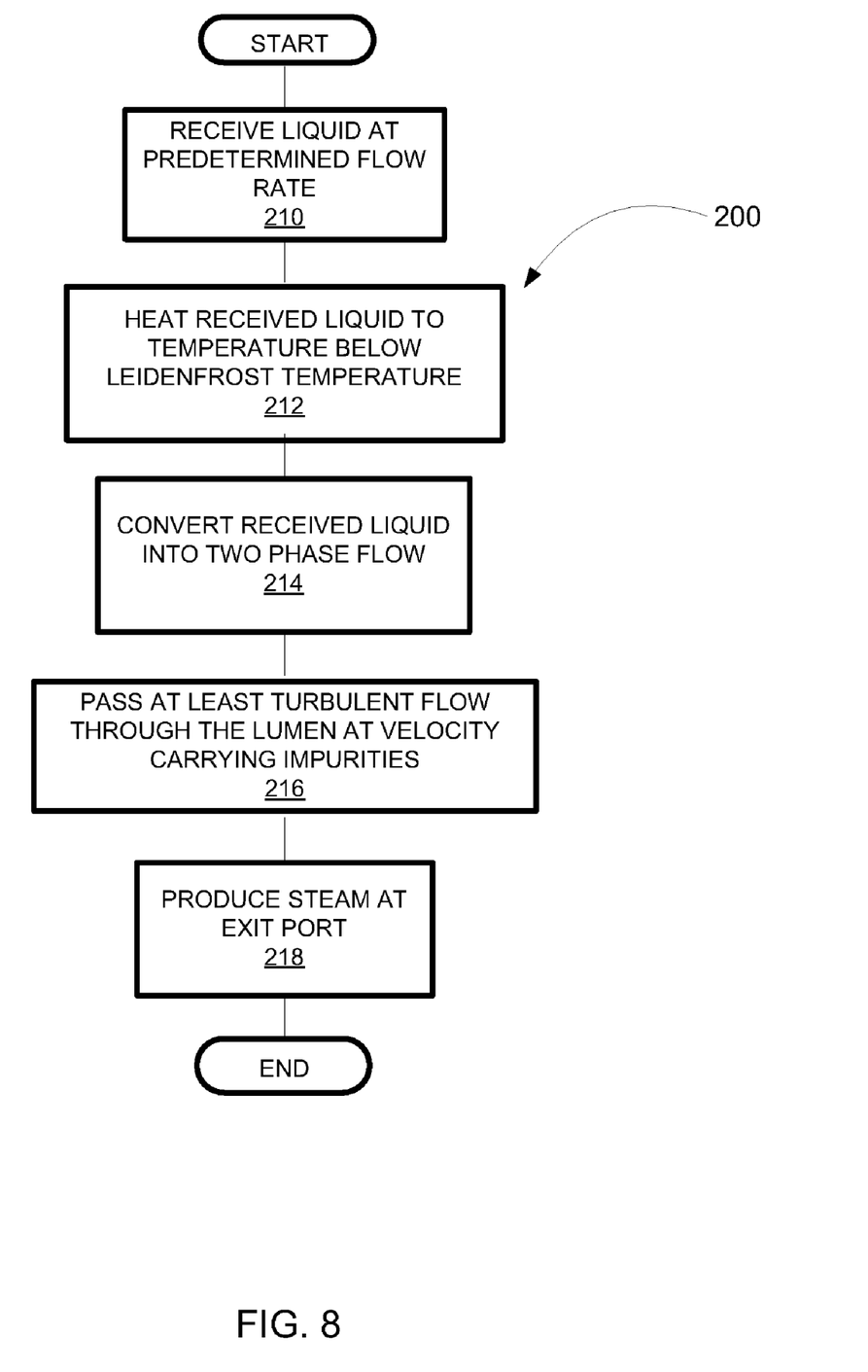
FIG. 8 depicts a high-level flow diagram illustrating one method of producing steam in a heating unit in accordance with one embodiment of the present invention.

FIG. 8 depicts a high level flow diagram illustrating one method of producing steam in a heating unit, generally designated 200. Method 200 comprises receiving a liquid (water for example) including impurities at a predetermined flow rate, block 210. In one embodiment the liquid is received using a spray nozzle within an entry port of a monotube in the heating unit, where the monotube has a lumen of a predetermined size.

FIG. 8 further depicts method 200 including heating the received liquid (in the monotube for example) to a predetermined temperature below a Leidenfrost temperature for the liquid, block 212. In one embodiment, where the liquid comprises water, the liquid is heated to a temperature in a range between about 325 degrees and about 460 degrees Fahrenheit, but generally to about 390 degrees Fahrenheit.

Method 200 further comprises the received liquid is converted into a two phase flow, the flow comprising turbulent and laminar flow, block 214. In one embodiment, where the received liquid comprises water, the liquid is converted into the two phase flow (responsive to an inner diameter and length of the lumen) at a Reynolds number greater than 2000. Method 200 further comprises the turbulent flow ($T_F$) and the laminar flow ($L_F$) are formed in a predetermined ratio of $T_F/L_F \leqq 0.10\,(T_F+L_F)$.

FIG. 8 further illustrates that at least the turbulent flow is passed through the lumen at a velocity sufficient to carry the impurities through an exit port of the monotube, block 216. In one embodiment, the velocity is responsive to at least the predetermined flow rate and predetermined size of the lumen. Finally, steam is produced at an exit port, block 218.

Figure 9:
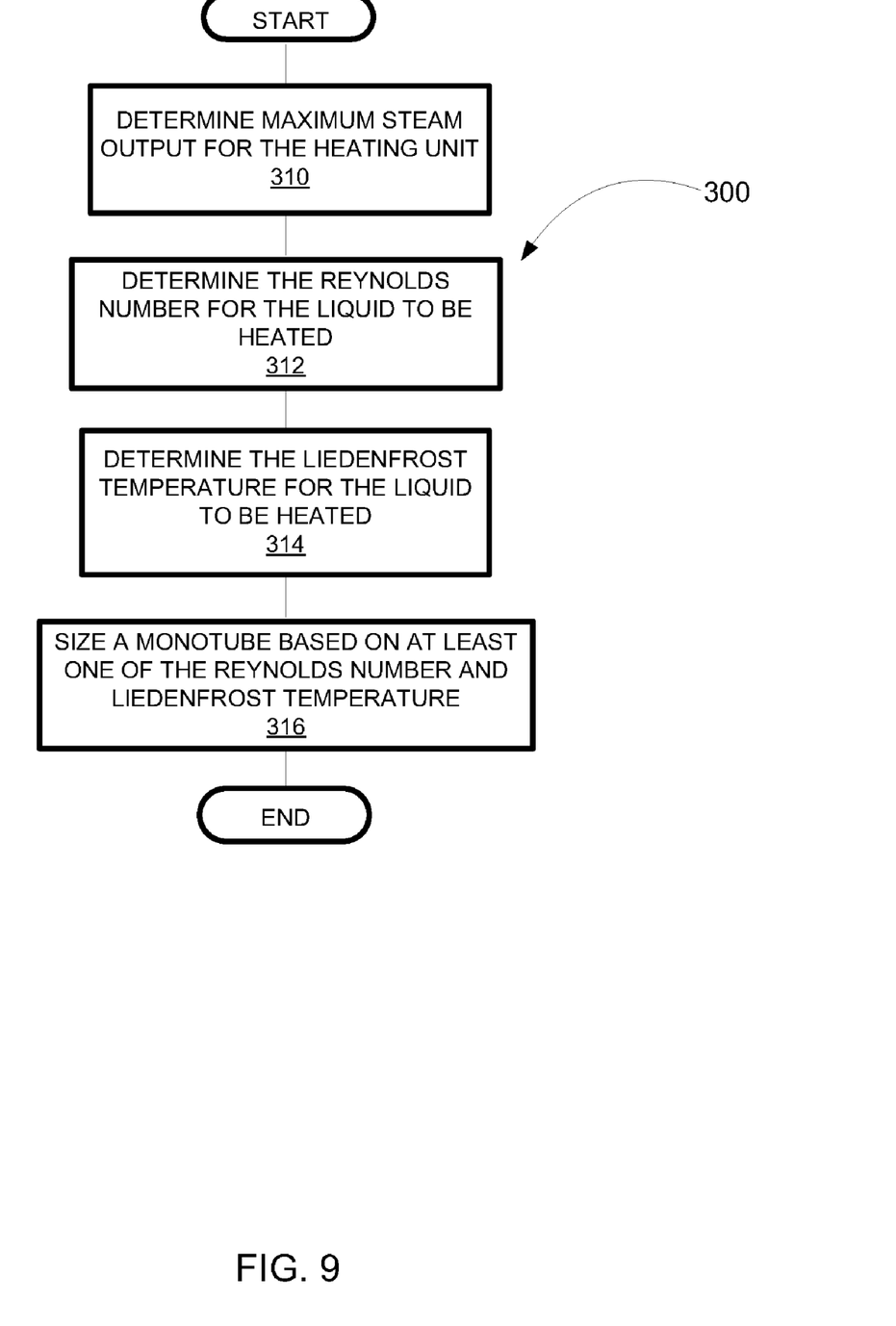
FIG. 9 depicts a high-level flow diagram illustrating one method of designing a heating unit for producing steam in accordance with one embodiment of the present invention.

FIG. 9 depicts a high-level flow diagram illustrating one method of designing a heating unit for producing steam, generally designated 300. In the illustrated embodiment, method 300 comprises determining a maximum steam output required of the heating unit, block 310. The maximum steam output is determined for a liquid (water for example) received in the heating unit at a predetermined flow rate. The liquid can be converted into a two phase flow comprising turbulent and laminar flow. Method 300 further comprises determining the Reynolds number for the liquid, block 312 and the Liedenfrost temperature for the liquid, block 314.

FIG. 9 further depicts the method 300 comprises sizing a monotube based on the Reynolds number, the Liedenfrost temperature or both, block 316. Sizing the monotube comprises sizing a lumen in the monotube, such that at least the turbulent flow is passed through the lumen at a velocity sufficient to carry the impurities through an exit port of the monotube in fluid communication with the lumen and produce the steam at the exit port, where the velocity is responsive to the predetermined flow rate and the size of the monotube.

In accordance with one embodiment of the invention, the thermal output of a heating apparatus 12 is matched to the desired maximum output by calculating the heat of vaporization of the liquid required to produce the steam. For example, to produce a maximum capacity of 30 pounds of steam per hour using water, the heating apparatus 12 requires a heater capacity of 10 kW including 10% excess to super heat steam.

The entry port 22/122 and/or lumen 146 must be sized such that a small amount of water, less than 10% of the input flow for example, will boil quickly enough to steam. The resultant two phase water-steam flow is above the laminar turbulent transition or Reynolds number greater than 2000. In this example, to produce a maximum capacity of 30 pounds of steam per hour, the predetermined input flow rate would be 250 ml/min, the inner diameter of the monotube (the lumen) would be 0.25 inches, and the monotube would have 25 coils or turns. Preferably the heating apparatus would be 5 inches in diameter and 10 inches overall in length. The heating apparatus would, in at least one embodiment, only consume power when steam is produced.

Alternative embodiments are also contemplated. For example, the heating apparatus 112 could include monotube 118 having turns of different inner diameters or lumens (10 turns having one inner diameter and 15 turns having a different inner diameter for example). The heating apparatus could include a disposable insert, where the insert could replace the entire water injection section or just a portion thereof (a wall insert for example). Additionally, the heating apparatus 12/112 could be modified to include injecting an acid (or other solution) into the water injection zone during a shut-down cycle.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of producing steam in a heating unit for use in cooking, the method comprising:
   receiving, via a spray device, a liquid including impurities at a predetermined flow rate within an entry port of a monotube in the heating unit, said monotube having a lumen of a predetermined size, said monotube formed as coiled monotube having a plurality of turns;
   converting, via application of heat produced by at least one heating device of the heating unit, said received liquid into a two phase flow of liquid and gas, said flow comprising both turbulent and laminar flow; and
   passing at least said turbulent flow through said lumen at a velocity sufficient to carry said impurities through an exit port of said monotube in fluid communication with said lumen and producing the steam at said exit port, wherein said velocity is responsive to at least said predetermined flow rate and predetermined size of said lumen;
   and delivering the steam to a cooking chamber of a cooking device to cook or re-therm food products therein, the cooking device including a control unit coupled to the spray device and the heating device to control steam production.

2. The method of claim 1 wherein said turbulent flow ($T_F$) and said laminar flow ($L_F$) are formed in a predetermined ratio of $T_F/L_F \leq 0.10 (T_F+L_F)$.

3. The method of claim 1 wherein said predetermined size of said lumen comprises an inner diameter and length of said lumen.

4. The method of claim 3 wherein said received liquid is converted into said two phase flow responsive to said inner diameter and length of said lumen at a Reynolds number greater than 2000.

5. The method of claim 1 wherein converting said received liquid into said two phase flow comprises heating said monotube to a temperature below a Leidenfrost temperature for said liquid.

6. The method of claim 5 wherein said temperature is in a range of about 325 degrees and about 460 degrees Fahrenheit.

7. The method of claim 6 wherein said temperature is about 390 degrees Fahrenheit.

8. The method of claim 1 comprising receiving said liquid as a spray.

9. A heating apparatus for producing steam comprising:
   means for receiving a liquid including impurities at a predetermined flow rate;
   means for converting said received liquid into a two phase flow of liquid and gas, said flow comprising turbulent and laminar flow; and
   means for passing at least said turbulent flow there through at a velocity sufficient to carry said impurities along and produce the steam, wherein said passing means is responsive to at least said predetermined flow rate and a predetermined size of said passing means, said passing means including a coil-shaped flow path.

10. The heating apparatus of claim 9 wherein said receiving means comprises at least one spray that delivers the liquid into the coil-shaped flow path.

11. The heating apparatus of claim 9 wherein said converting means comprising at least one heating element adapted to heat at least said received liquid to a predetermined temperature below a Leidenfrost temperature for said liquid.

12. The heating apparatus of claim 9 wherein said converting means produces said turbulent flow ($T_F$) and said laminar flow ($L_F$) in a ratio of $T_F/L_F \leq 0.10 (T_F+L_F)$.

13. The heating apparatus of claim 9 wherein said received liquid is converted into said two phase flow at a Reynolds number greater than 2000.

14. A heating unit for producing steam, comprising:
   a flow path;
   a spray device for delivering liquid including impurities into the flow path;
   a heating device positioned to deliver heat to the walls of the flow path;
   a control unit coupled to the spray device and the heating device to control water delivery and heat production such that liquid in the flow path is converted into a two phase flow of liquid and gas, the flow comprising both turbulent and laminar flow, and at least the turbulent flow is passed through the flow path at a velocity sufficient to carry the impurities through to an exit port of the flow path along with steam produced at the exit port.

15. The heating unit of claim 14 wherein the flow path is a coil-shaped flow path.

* * * * *